US009358533B2

(12) United States Patent
Tran et al.

(10) Patent No.: US 9,358,533 B2
(45) Date of Patent: Jun. 7, 2016

(54) HOLLOW MICROSPHERE CATALYST SUPPORT AND METHODS OF MAKING SAME

(71) Applicant: BASF Corporation, Florham Park, NJ (US)

(72) Inventors: Pascaline Harrison Tran, Holmdel, NJ (US); Michael P. Galligan, Cranford, NJ (US); Ye Liu, Holmdel, NJ (US); Xiaolin David Yang, Edison, NJ (US); Qingyuan Hu, East Brunswick, NJ (US); Doan Lieu, Cedar Grove, NJ (US)

(73) Assignee: BASF Corporation, Florham Park, NJ (US)

( * ) Notice: Subject to any disclaimer, the term of this patent is extended or adjusted under 35 U.S.C. 154(b) by 647 days.

(21) Appl. No.: 13/722,374

(22) Filed: Dec. 20, 2012

(65) Prior Publication Data

US 2014/0178262 A1    Jun. 26, 2014

(51) Int. Cl.
*B01D 53/34* (2006.01)
*B01D 53/56* (2006.01)
(Continued)

(52) U.S. Cl.
CPC ............... *B01J 32/00* (2013.01); *B01D 53/945* (2013.01); *B01J 21/04* (2013.01); *B01J 21/066* (2013.01); *B01J 23/58* (2013.01); *B01J 23/63* (2013.01); *B01J 35/008* (2013.01);
(Continued)

(58) Field of Classification Search
CPC ............ B01J 21/04; B01J 21/06; B01J 21/08; B01J 23/02; B01J 23/04; B01J 23/10; B01J 23/40; B01J 23/56; B01J 23/58; B01J 23/63; B01D 53/56; B01D 53/945; B01D 53/8628; B01D 53/864; B01D 53/8643; B82Y 30/00

USPC ......... 502/240, 243, 250–252, 261–263, 300, 502/302, 303, 328, 330, 332–334, 339, 502/439; 422/170, 177, 180; 423/213.2, 423/213.5, 239.1, 249; 977/773, 775; 428/402
See application file for complete search history.

(56) References Cited

U.S. PATENT DOCUMENTS

| | | | | |
|---|---|---|---|---|
| 3,420,645 A | * | 1/1969 | Hair | ............... C03C 17/06 427/215 |
| 3,458,332 A | * | 7/1969 | Alford | ............... C03C 11/00 106/409 |

(Continued)

FOREIGN PATENT DOCUMENTS

| | | |
|---|---|---|
| EP | 0940176 A2 | 9/1999 |
| EP | 1669135 A1 | 6/2006 |
| WO | 2009/011658 A1 | 1/2009 |

OTHER PUBLICATIONS

International Preliminary Report on patentability dated Jun. 23, 2015.

(Continued)

*Primary Examiner* — Cam N. Nguyen
(74) *Attorney, Agent, or Firm* — Womble Carlyle Sandridge & Rice LLP

(57) ABSTRACT

Hollow porous metal oxide microspheres are provided. The microspheres may be used as a support for a catalyst, particularly an exhaust treatment catalyst for an internal combustion engine. Also provided are methods of making the microspheres, methods of using the microspheres as catalyst supports, and methods of exhaust treatment using catalyst articles comprising the microspheres.

22 Claims, 8 Drawing Sheets

(51) Int. Cl.

| | |
|---|---|
| *B01D 53/86* | (2006.01) |
| *B01D 53/94* | (2006.01) |
| *B01J 8/00* | (2006.01) |
| *B01J 8/02* | (2006.01) |
| *C01B 21/00* | (2006.01) |
| *B01D 50/00* | (2006.01) |
| *B32B 5/16* | (2006.01) |
| *B01J 21/00* | (2006.01) |
| *B01J 21/04* | (2006.01) |
| *B01J 23/00* | (2006.01) |
| *B01J 23/02* | (2006.01) |
| *B01J 23/10* | (2006.01) |
| *B01J 23/42* | (2006.01) |
| *B01J 23/44* | (2006.01) |
| *B01J 23/56* | (2006.01) |
| *B01J 23/58* | (2006.01) |
| *B01J 32/00* | (2006.01) |
| *B01J 23/63* | (2006.01) |
| *B01J 37/02* | (2006.01) |
| *B01J 37/04* | (2006.01) |
| *B01J 37/08* | (2006.01) |
| *B01J 21/06* | (2006.01) |
| *B01J 35/00* | (2006.01) |
| *B01J 35/02* | (2006.01) |
| *B01J 35/04* | (2006.01) |
| *B01J 35/08* | (2006.01) |
| *B01J 35/10* | (2006.01) |
| *B01J 37/00* | (2006.01) |

(52) U.S. Cl.
 CPC ............ *B01J 35/0013* (2013.01); *B01J 35/023* (2013.01); *B01J 35/04* (2013.01); *B01J 35/08* (2013.01); *B01J 35/1019* (2013.01); *B01J 35/1038* (2013.01); *B01J 35/1061* (2013.01); *B01J 37/0036* (2013.01); *B01J 37/0045* (2013.01); *B01J 37/0072* (2013.01); *B01J 37/0211* (2013.01); *B01J 37/0225* (2013.01); *B01J 37/04* (2013.01); *B01J 37/082* (2013.01); *B01D 53/9477* (2013.01); *B01D 2255/92* (2013.01); *B01D 2258/012* (2013.01); *Y02T 10/22* (2013.01); *Y10T 428/2982* (2015.01)

(56) References Cited

U.S. PATENT DOCUMENTS

| | | | |
|---|---|---|---|
| 3,792,136 A * | 2/1974 | Schmitt | C04B 14/30 |
| | | | 252/635 |
| 4,039,480 A * | 8/1977 | Watson | B01D 53/86 |
| | | | 502/263 |
| 4,793,980 A | 12/1988 | Torobin | |
| 5,212,143 A | 5/1993 | Torobin | |
| 5,492,870 A | 2/1996 | Wilcox et al. | |
| 6,221,805 B1 | 4/2001 | Yamashita et al. | |
| 7,446,076 B2 | 11/2008 | Miyoshi et al. | |
| 2002/0045543 A1 | 4/2002 | Takatori et al. | |
| 2004/0170692 A1* | 9/2004 | Day | A61K 33/42 |
| | | | 424/489 |
| 2006/0128562 A1 | 6/2006 | Miyoshi et al. | |
| 2008/0182019 A1* | 7/2008 | Retter | B01J 13/04 |
| | | | 427/214 |
| 2008/0182056 A1* | 7/2008 | Bakker | A61K 9/5089 |
| | | | 428/36.8 |
| 2010/0093013 A1* | 4/2010 | Asefa | B81C 99/0095 |
| | | | 435/28 |
| 2010/0264097 A1 | 10/2010 | Sun et al. | |
| 2012/0296124 A1* | 11/2012 | Asefa | B01J 21/08 |
| | | | 564/417 |

OTHER PUBLICATIONS

"Hollow Alumina Particles with the Nano-shell Structure", *R&D Review of Toyota CRDL* vol. 34 No. 3 1999, 1 pg.

Chatterjee, M. et al., "Hollow alumina microspheres from boehmite sols", *Journal of Materials Science 33* 1998, 4937-4942.

De Almeida, Rusiene M. et al., "Preparation and evaluation of porous nickel-alumina spheres as catalyst in the production of hydrogen from decomposition of methane", *Journal of Molecular Catalysis A: Chemical 259* 2006, 328-335.

Hyodo, Takeo et al., "Preparation of hollow alumina microspheres by microwave-induced plasma pyrolysis of atomized precursor solution", *Journal of European Ceramic Society 25* 2005, 3563-3572.

Kato, Takayuki et al., "Effect of Core Materials on the Formation of Hollow Alumina Microspheres by Mechanofusion Process", *J. Am. Ceram. Soc. 87*(1) 2004, 60-67.

Palkar, V. R., "Efficiency of Pd impregnated sol-get derived y-alumina porous spheres as catalyst", *The European Physical Journal D 16* 2001, 253-255.

Wang, Yenwen et al., "A Novel Technique for Synthesizing Nanoshell Hollow Alumina Particles", *J. Am. Ceram. Soc 92*(S1) 2009, S32-S37.

Yang, Weiyou et al., "Hollow Alumina Microsphere Chain Networks", *J. Am. Ceram. Soc. 92*(1) 2009, 280-282.

International Search Report Apr. 3, 2014.

Hauer, B., "Tiny Bubbles," *Ceramic Industry*, BNP Media, 2007, Retrieved Dec. 30, 2015 from ceramicindustry.com.

\* cited by examiner

HOLLOW MICROSPHERE CATALYST SUPPORT AND METHODS OF MAKING SAME

TECHNICAL FIELD

The invention relates to the field of catalysts and catalyst supports for use in treatment of motorcycle and automotive engine exhaust.

BACKGROUND

The exhaust gases of internal combustion engines contain pollutants such as hydrocarbons, carbon monoxide and nitrogen oxides ($NO_x$) that foul the air. Emission standards for unburned hydrocarbons, carbon monoxide and nitrogen oxide contaminants have been set by various governments and must be met by older as well as new vehicles. In order to meet such standards, catalytic converters containing a three way catalyst (TWC) may be located in the exhaust gas line of internal combustion engines. The use of exhaust gas catalysts have contributed to a significant improvement in air quality. The TWC is the most commonly used catalyst and it provides the three functions of oxidation of CO, oxidation of unburned hydrocarbons (HC's) and reduction of NOx to $N_2$. TWCs typically utilize one or more platinum group metals (PGM) to simultaneously oxidize CO and HC and reduce NOx compounds. The most common catalytic components of a TWC are platinum (Pt), rhodium (Rh) and palladium (Pd).

The platinum group metals (PGM) in the TWC catalysts (e.g., platinum, palladium, rhodium, ruthenium and iridium) are typically dispersed on a high surface area, refractory metal oxide support, e.g., a high surface area alumina coating, or on an oxygen storage component (OSC), or their mixtures. The support is carried on a suitable carrier or substrate such as a monolithic substrate comprising a refractory ceramic or metal honeycomb structure, or refractory particles such as spheres or short, extruded segments of a suitable refractory material. The TWC catalyst substrate may also be a wire mesh, typically a metal wire mesh, which is particularly useful in small engines.

Refractory metal oxides such as alumina, rare-earth metal oxides, zirconia, titania, and their combinations, and other materials are commonly used as supports for the catalytic components of a catalyst article and as oxygen storage materials (OSC). Currently, almost all of the alumina catalyst supports and OSC are in the form of solid powder particles with a particle size ranging from about 5-100 microns or are large extrudates above 100 microns in size. The alumina support materials typically exhibit a BET surface area in excess of 60 square meters per gram ("$m^2/g$"), often up to about 200 $m^2/g$ or higher.

In an internal combustion engine it is also desirable for these catalyst support materials to have high meso- and macro-porosity to enhance gas phase diffusion, which makes the catalysts more effective to achieve high nitrogen oxide (NOx) and hydrocarbon (HC) conversion at high space-velocity. In this regard, porous microspheres, including hollow microspheres, have been used as catalyst supports for the purpose of improving the porosity of the catalytic washcoat. Various preparation methods for such microspheres are reported in the literature. However, in general, hollow alumina microspheres that are formed at lower temperatures are thin-walled egg-shell structures that are too fragile to resist mechanical milling during catalyst preparation and hydrothermal aging in the engine. Thick-walled hollow alumina spheres are more robust against mechanical and thermal aging, and are available commercially (e.g., as insulation material), but these materials either have a large particle size or have been sintered at too high a temperature for catalyst applications. Hollow alumina microspheres made using ion-extraction of boehmite sols followed by firing at 1200° C. have been shown to have thick walls; however, these microspheres are in the dense alpha crystalline phase.

There remains a need for hollow porous microspheres suitable for use as catalyst supports which can be made by simple manufacturing methods, and which have thick walls with small spherical diameters. The availability of such microspheres also leads to a significant reduction in raw material usage (e.g., precious metal, alumina, and OSC) and therefore a substantial reduction in cost because of elimination of the dead space in the center of the conventional solid particle.

SUMMARY

In one aspect, the invention relates to a composition comprising hollow porous metal oxide microspheres. In a particular embodiment, the microspheres comprise walls having a thickness of about 1-5 µm, typically about 1-3 µm or about 2 µm, surrounding a hollow center and the diameter range of the hollow metal oxide microspheres is about 5-15 µm, typically 8-12 µm, or about 9-11 µm. Desirably, the average diameter ($D_{90}$) is about 10 µm. The microspheres may further comprise a catalyst, such as a catalyst for treatment of engine exhaust gases.

In one embodiment of the hollow porous metal oxide microspheres, a catalyst is incorporated within the walls of the hollow metal oxide microspheres. In an alternative embodiment, a catalyst is present in higher concentration on or near the external surface of the microspheres.

In a particular variant of either of the foregoing embodiments, the microspheres further comprise a stabilizer. Examples of suitable stabilizers include, but are not limited to, lanthanides, silicon, alkaline earth metals, transition metals or combinations thereof. Lanthanides such as lanthanum are a specific stabilizer for use in the invention.

In a further aspect, the invention relates to a catalyst article for use in an internal combustion engine, the catalyst article comprising a catalytic layer formed on a substrate, and the catalytic layer comprising any of the foregoing hollow metal oxide microsphere compositions.

In certain embodiments of the foregoing catalyst article, the substrate is a monolithic substrate or a metal substrate.

In certain embodiments, the catalyst article is made by depositing a slurry on a substrate to form a catalytic layer or multi-layers on the substrate, the slurry comprising any of the foregoing hollow porous metal oxide microsphere compositions which comprise a catalyst.

In a further aspect, the invention relates to methods for treating engine exhaust comprising hydrocarbons, carbon monoxide and/or nitrogen oxides, the methods comprising contacting the exhaust with the hollow porous metal oxide microspheres or catalyst articles described above under conditions suitable for oxidation of carbon monoxide, oxidation of hydrocarbons and/or reduction of nitrogen oxides.

In a further aspect, the invention relates to emissions treatment systems for treating engine exhaust, the emissions treatment system comprising a catalyst article in accordance with any of the foregoing embodiments in emissions flow communication with an engine exhaust stream. In certain embodiments, the emissions treatment system further comprises at least one of a diesel oxidation catalyst, a diesel particulate filter, a catalytic partial oxidation catalyst, an ammonia oxidation catalyst, a reductant injector, an air injector, a hydrocarbon injector and a selective catalytic reduction catalyst.

In a further aspect, the invention relates to methods for making hollow porous metal oxide microspheres comprising dissolving a thermodegradable polymer template in an aqueous medium to form micelles of the polymer template; slurrying nanoparticles of a metal oxide precursor with the dissolved polymer template; spray drying the slurry; and calcining the spray-dried slurry to thermodegrade the polymer template, thereby forming hollow metal oxide microspheres. In certain embodiments the polymer template is a soft polymer template. In other embodiments, a catalyst is included in the slurry prior to spray drying. In an alternative embodiment, a catalyst is impregnated into the microspheres after spray drying.

In any embodiment of the hollow porous metal oxide microsphere compositions or catalytic articles comprising a catalyst, the catalyst may be a platinum group metal. Suitable platinum group metals include any of platinum, palladium, rhodium and combinations thereof.

BRIEF DESCRIPTION OF THE DRAWINGS

FIG. 2A is a traditional washcoat comprised of solid particles. FIG. 2B is a washcoat comprised of a mixture of hollow microspheres and solid particles. FIG. 2C is a washcoat comprised entirely of hollow microspheres.

DETAILED DESCRIPTION

Figure 1A:
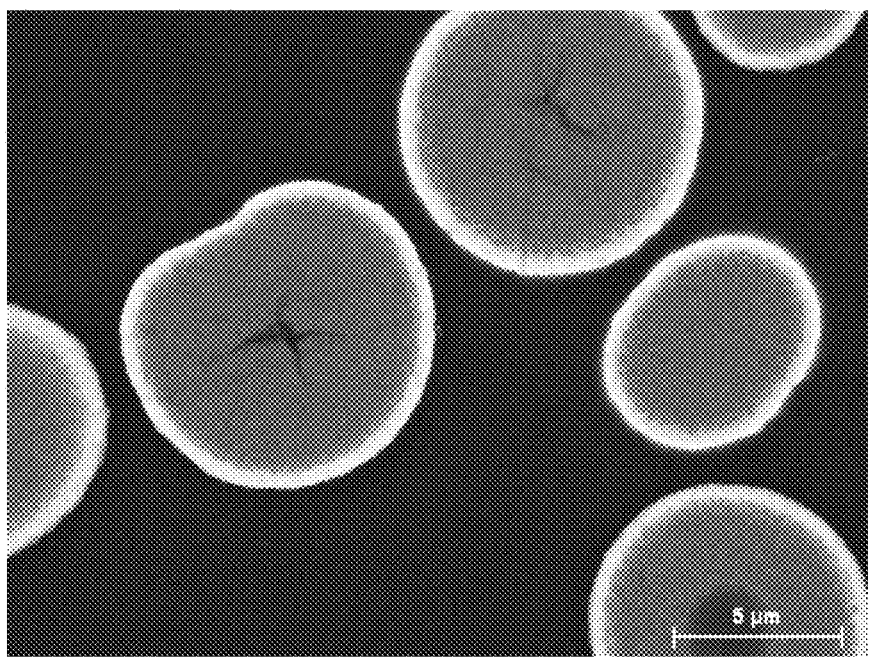
FIG. 1A is an SEM cross section of solid $ZrO_2/Al_2O_3$ particles made by spray-drying.

Before describing several exemplary embodiments of the invention, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the terms "nanoparticle" or "nano-sized particle" refer to a particle having a diameter in the nanometer range (about 1-999 nm). The term "microparticle" refers to a particle having a diameter in the micrometer or micron range (about 1-999 µm). Similarly, the term "microsphere" refers to a generally spherical agglomeration of smaller particles which has a diameter in the micrometer or micron range.

As used herein, the terms "agglomerate," "agglomerated," and the like with respect to a catalyst support refers to the collection of individual smaller particles of one or more components into a larger, generally spherical, particle or mass, around a central particulate template. Following removal of the template, the agglomerated particles remain as a hollow microsphere having a wall comprised of the agglomerated particles surrounding a hollow center.

Certain aspects of the invention provide hollow porous microspheres suitable for use as catalyst supports, the microspheres comprising agglomerated nanoparticles of metal oxide, such as a high surface area metal oxide. The catalyst support is useful for supporting one or more catalysts or catalyst components on its surface or within the walls of the hollow microsphere. In one or more embodiments, the metal oxide comprises an activated compound selected from the group consisting of alumina, boehmite, pseudoboehmite, ceria, zirconia, ceria-zirconia, alumina-zirconia, alumina-ceria-zirconia, lanthana-alumina, lanthana-zirconia-alumina, baria-alumina, baria-lanthana-alumina, baria-lanthana-neodymia alumina, and alumina-ceria. In one or more specific embodiments the nanoparticles are alumina or boehmite nanoparticles. In further specific embodiments the nanoparticles are $CeO_2$ nanoparticles.

In certain embodiments, the average diameter of the metal oxide nanoparticles is about 50-500 nm. In specific embodiments, the average diameter of the metal oxide nanoparticles is about 100 nm. If the particles of the starting material are larger, they may be milled to the desired size prior to forming the catalyst support. After spray-drying, the average diameter of the hollow porous microspheres, measured in $D_{90}$, is about 5-20 µm, typically about 8-12 µm, or about 9-11 µm. Desirably, the $D_{90}$ diameter range is about 10 µm. The wall thickness of the microspheres is about 1-5 µm, typically about 1-3 µm, and more typically about 2 µm. If necessary to achieve the desired diameter range, the hollow porous microspheres may be milled to reduce the average diameter range.

In another embodiment, the hollow porous micro spheres according to any of the foregoing embodiments may further comprise a stabilizer, such as a lanthanide, an alkaline earth metal, silicon, a transition metal or combinations thereof. Suitable stabilizers include barium oxides, lanthanum oxides, zirconium oxides, and combinations thereof. The content of the stabilizer is in the range between 1-20 wt %. The stabilizer may be incorporated in the hollow porous microspheres as the oxide form or as a precursor, such as a nitrate form, which is subsequently oxidized. In any of the embodiments of the invention in which the hollow porous microspheres comprise a stabilizer, the stabilizer may be included in the walls of the microsphere or on its surface. The stabilizer may be added to the slurry with the metal oxide nanoparticles prior to spray-drying. This procedure results in agglomerated metal oxide particles with the metal oxide and the stabilizer within the walls of the microsphere. Alternatively, the stabilizer may be impregnated into the walls of the microsphere after spray drying and removal of the template. The stabilizer and metal oxide nanoparticles may occur as a mixture within the walls; however, in certain embodiments the stabilizer may be found at higher concentration deposited on the exterior surface of the microsphere and therefore appear as a layer. Specific examples of hollow porous metal oxide/stabilizer microspheres include $ZrO_2/CeO_2$ and $ZrO_2/Al_2O_3$.

Figure 1B:
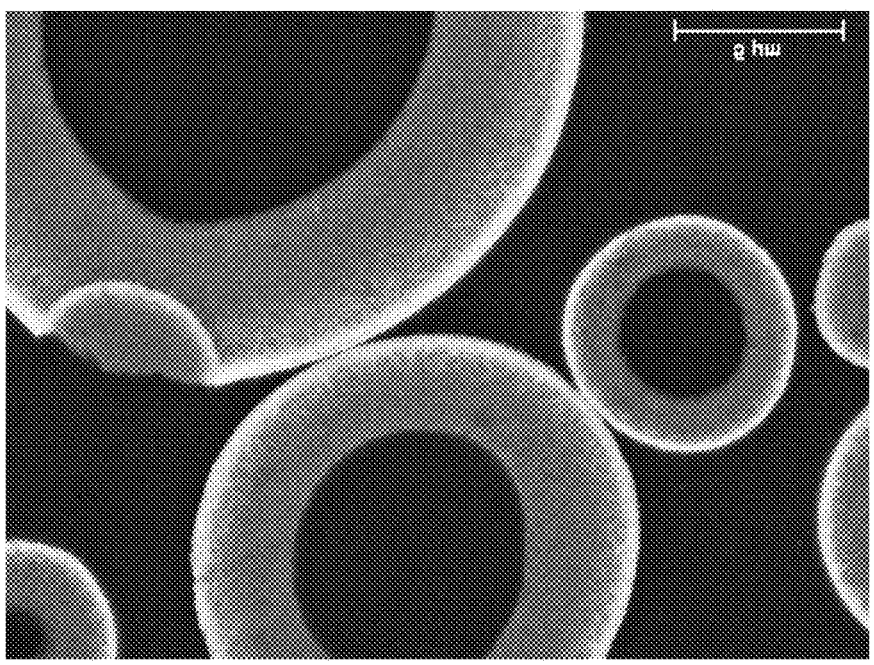
FIG. 1B is an SEM cross section of $ZrO_2/Al_2O_3$ hollow microspheres made by spray drying according to the invention.

In a specific embodiment, the microsphere comprises zirconium oxide on or near its exterior surface. It has been observed that zirconium oxide which is added to the slurry with alumina nanoparticles prior to spray-drying accumulates in higher concentration at or on the exterior surface of the microsphere during spray-drying, resulting in an exterior layer of zirconium oxide that is visible on SEM. This layered configuration is very useful as a barrier to separate a rhodium catalyst from alumina in the microspheres. The multi-layer structure is shown in FIG. 1B, where the exterior layer of zirconium oxide is seen as a lighter layer over the alumina walls of the hollow microsphere on SEM. FIG. 1A shows that a similar zirconium oxide layer is also formed on the exterior surface of the solid alumina nanoparticles when they are spray dried without the soft polymer template and do not form hollow microspheres.

In another embodiment, any of the foregoing embodiments of the hollow porous microspheres may further comprise one or more catalysts or catalyst components which upon calcination or use decomposes or otherwise converts to a catalytically active form of the catalyst (usually the metal or the metal oxide). In a specific example, the hollow porous microspheres may comprise the metal oxide nanoparticles, a stabilizer and one or more catalysts, and/or one or more catalyst components. The catalyst or catalyst component, if present, should be water-soluble or water-dispersible in the aqueous liquid of the slurry. As an example, suitable catalysts include one or more PGM catalysts or PGM catalyst components. In certain embodiments, the catalyst or catalyst component is incorporated within the walls of the microsphere, which may be accomplished by including it in the slurry with the metal oxide nanoparticles during manufacture or by impregnating it into the walls after manufacture.

In a further embodiment, the hollow porous micro spheres according to any of the foregoing embodiments further comprise additional components such as promoters. These promoters can be metal oxide of zinc, nickel and bismuth. Such additional components may also be incorporated within the walls of the microsphere by including them in the slurry with the metal oxide nanoparticles during manufacture or by impregnating them into the walls after manufacture.

The hollow porous microspheres described herein have been found to be less dense than the corresponding solid powder metal oxide, which provides a weight advantage when they are used as catalyst supports and included in a catalyst article for engine exhaust treatment applications. In certain examples, the density of the microspheres is reduced by about 37% compared to the corresponding solid powder. The hollow porous microspheres maintain their integrity after aging (for example 750° C./10% $H_2O$/air/20 hrs.). Good catalyst distribution is also maintained on the hollow porous microspheres after aging, and the hollow structure reduces dead space and the amount of materials required in manufacturing.

Figure 2A:
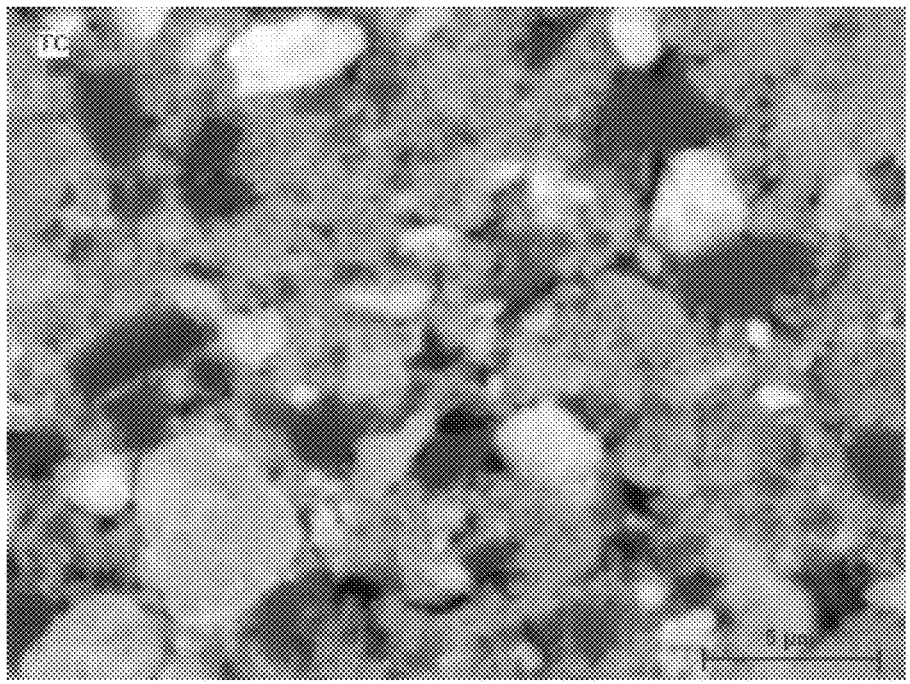
FIGS. 2A, 2B and 2C are SEM cross sections illustrating the macroporosity of washcoats having different structural components.
Figure 2B:
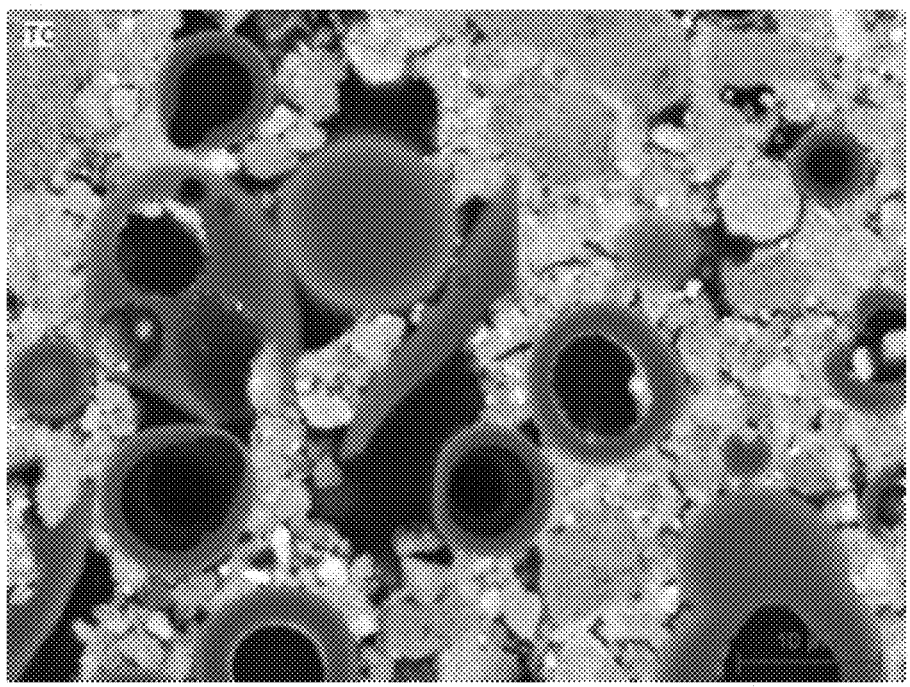
Figure 2C:
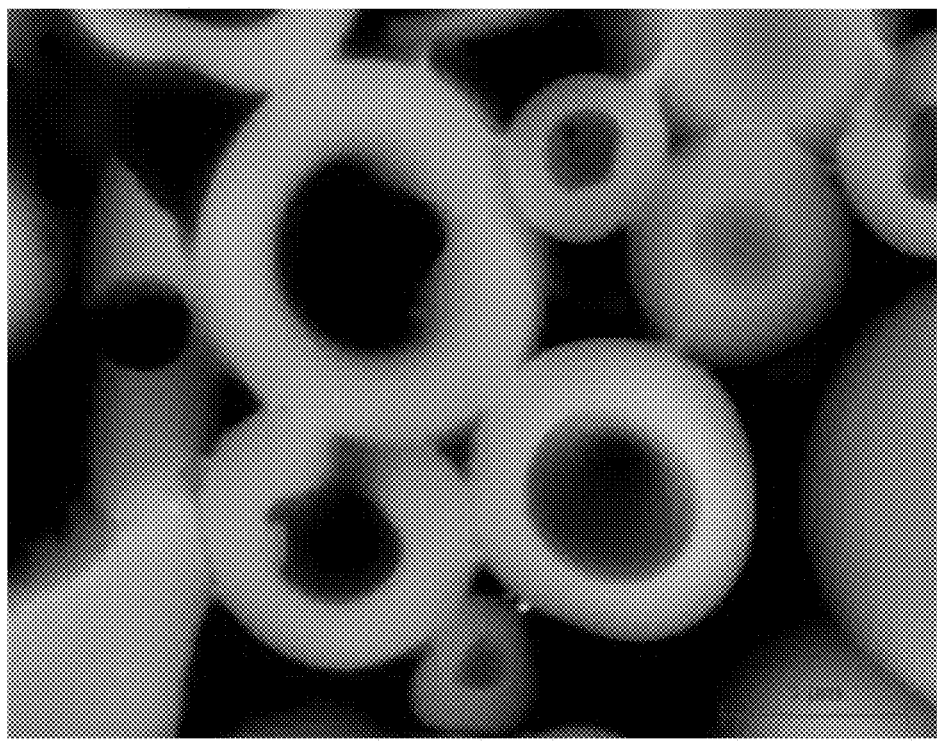

It should be pointed out that the micro-porosity of the hollow porous microspheres is similar to the corresponding solid particle metal oxide, as illustrated in the following example of hollow porous alumina microspheres. This is because the formation of the hollow sphere structure increases the macro-porosity of the materials, but not their microsphere structures. FIGS. 2A, 2B and 2C are SEMs illustrating the difference in macroporosity of different $Al_2O_3$/OSC washcoats. FIG. 2A shows the traditional washcoat, comprised of solid particles of alumina (dark color) and OSC (lighter color). It can be seen that the traditional washcoat has low macroporosity, which results in limitation of gas diffusion through the washcoat. FIG. 2B shows a washcoat comprised of a mixture of hollow microsphere alumina according to the invention with solid OSC particles. This formulation produces a washcoat with increased macroporosity compared to the traditional washcoat, and it exhibits improved catalyst activity. FIG. 2C shows a washcoat comprised entirely of hollow microsphere alumina and OSC according to the invention. This washcoat has the highest macroporosity and therefore the highest rate of gas diffusion through the washcoat and most improved catalyst activity.

Another aspect of the invention provides a catalyst article comprising a catalyst layer on a substrate, the catalyst layer comprising the hollow porous microspheres according to any of the foregoing embodiments as a catalyst support. The hollow porous microspheres comprise agglomerated metal oxide nanospheres, a catalyst supported by the catalyst support, and, optionally, a stabilizer. The catalyst support may in the form of a washcoat on the substrate. In specific embodiments, the catalyst may be one or more PGM catalysts, such as palladium, platinum, rhodium or combinations thereof.

According to one or more embodiments of the catalyst article, the substrate to which the catalyst support is applied may be any of the materials typically used for preparing TWC catalyst articles and will typically comprise a metal or ceramic structure. Any suitable substrate may be employed, such as a monolithic substrate of the type having a plurality of fine, parallel gas flow passages extending therethrough from an inlet or an outlet face of the substrate, such that passages are open to fluid flow therethrough. The passages, which are essentially straight paths from their fluid inlet to their fluid outlet, are defined by walls on which the catalytic material is coated by the washcoat so that the gases flowing through the passages contact the catalytic material. The flow passages of the monolithic substrate are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section. Coating may be accomplished by any of the coating methods known in the art, such as manual dipping or airbrushing, followed by drying and calcining, typically at 490-550° C. for 1-2 hrs.

The ceramic substrate may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α-alumina, aluminosilicates and the like. The substrates useful for the catalyst supports of the present invention may also be composed of one or more metals or metal alloys. The metallic substrates may be employed in various shapes such as corrugated sheet, metal plate, wire mesh or monolithic form.

Yet another aspect of the invention provides methods for making the hollow porous microspheres. In one embodiment, the hollow porous microspheres of the invention may be produced by a spray-drying method which results in agglomeration of the nanoparticles of the metal oxide on the surface of a generally spherical polymeric micelle template. Calcination of the agglomerated nanoparticles burns off the micelle template in the center to produce the thick-walled hollow metal oxide microspheres of the invention. Any suitable thermodegradable polymer may be used as a template in the methods of the invention. Examples include alkylaryl polyether alcohols or synthetic copolymers of ethylene oxide and propylene oxide. Examples of three soft polymer templates useful in the hollow sphere alumina synthesis are two pluronic polymers P123® and F127® from BASF and a nonionic surfactant Triton®-X100 from Union Carbide. The pluronic polymers are synthetic copolymers of ethylene oxide and propylene oxide represented by the following chemical structure:

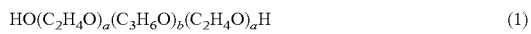
$$HO(C_2H_4O)_a(C_3H_6O)_b(C_2H_4O)_aH \quad (1)$$

while Triton® X-100 nonionic surfactant is of the type commonly described as alkylaryl polyether alcohols and has the following structural formula:

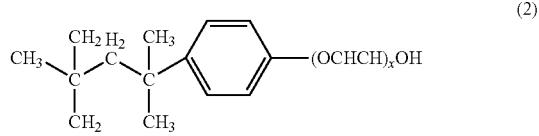

(2)

In one or more embodiments of the foregoing methods, the polymer template material is dissolved in an aqueous liquid such as water to form generally spherical micelles of the template material with the hydrophilic groups pointing toward the surface of the micelle. The nano-sized metal oxide particles are added to this aqueous mixture to form a slurry. In certain embodiments, about 1-5 wt % of the template is dissolved in the aqueous liquid. The weight percentage of the polymer is calculated based the dry weight of the metal oxide nanoparticles. The slurry is then spray-dried to volatilize the aqueous liquid and to cause the nano-sized metal oxide particles to agglomerate onto the hydrophilic surface of the generally spherical template. The template is then burned off from the center of the spray-dried agglomerates by calcination to form thick-walled hollow microspheres of the metal oxide. Nanoparticles of any suitable metal oxide may be used in the methods for manufacturing the hollow porous microspheres as discussed above; however, in specific embodiments the metal oxide is boehmite or pseudoboehmite, which have the advantage of a much smaller particle size than activated alumina such as γ-alumina for making the hollow microsphere alumina.

In specific embodiments, a stabilizer as described above is included in the slurry such that when the slurry is spray-dried and calcined the resulting hollow microspheres further comprise the stabilizer either distributed within the walls or appearing as a layer deposited on or in the exterior surface. Any suitable stabilizer may be used in the methods of the invention as discussed above; however, in specific embodiments the stabilizer is lanthanum. In any of the foregoing embodiments including a stabilizer, the stabilizer may be incorporated in the slurry as the oxide form or as a precursor such as a nitrate form which is subsequently oxidized.

In certain embodiments, a catalyst or catalyst component (for example one or more PGMs) is included in the slurry prior to spray-drying, in which case the catalyst is incorporated into the walls of the microsphere catalyst support in a single step. Alternatively, the catalyst may be impregnated into the walls or on the surface of the microsphere catalyst support after spray-drying using conventional impregnation techniques. For example, a solution of a catalyst or catalyst component (e.g., platinum group metal) may be put into the pores of the catalyst support by incipient wetness, where a volume of diluted platinum group metal is approximately equal to the pore volume of the catalyst support. Incipient wetness impregnation generally leads to a substantially uniform distribution of the solution of the precursor throughout the pore system of the walls or an enriched layer of the catalyst on the surface of the hollow microsphere catalyst support.

Any spray-drying processes suitable for volatilizing the aqueous liquid component of the slurry and producing the hollow porous microspheres may be used in the manufacturing methods described herein. As discussed above, in various embodiments, the slurry may comprise 1) the metal oxide nanoparticles; 2) both the metal oxide nanoparticles and the stabilizer, 3) the metal oxide nanoparticles, the stabilizer and the catalyst or catalyst component; or 4) the metal oxide nanoparticles, the stabilizer nanoparticles, the catalyst or catalyst component, and at least one additional component such as a promoter. If components such as the stabilizer and/or the catalyst are not included in the slurry prior to spray drying, they can be impregnated into the hollow porous microspheres after spray drying. Although nanoparticles of metal oxides are preferred precursors for making the hollow microsphere oxides, water soluble salts such as nitrate and acetate of the metal oxide can be also used in the slurry for the spray drying. In one embodiment, the spray-drying process comprises (1) dispersing pseudo-boehmite nanoparticles in water, (2) dissolving a soft polymer in water separately, (3) adding the polymer aqueous solution to the pseudo-boehmite aqueous slurry while stifling, (4) spray-drying the mixed slurry, and (5) calcining the spay dried powder at about 400-600° C., for example 550° C., in air. The spray drying process allows the metal oxide nanoparticles to form a layer over the polymer-template. Upon calcination the polymer template core is removed to produce the hollow structure. The particle size for the hollow microspheres made by this method is also generally suitable for the three-way catalyst coating on substrate without requiring a significant milling. However, if necessary or desirable to achieve a particular size range, the hollow microspheres may be milled after calcining. Use of a spray-drying process for manufacture of the hollow porous microspheres also provides the advantage of substantially 100% yield from the process, as well as providing cost savings due to the fact that a multi-component product can be produced in a single spray-drying process.

In general, the methods of making the hollow porous microspheres of the invention typically result in microspheres having an average diameter of approximately 10 μm. The $D_{90}$ range of diameter is generally about 5-20 μm. In specific embodiments, the average diameter of the microspheres ranges from 8-12 or 9-11 μm measured in $D_{90}$.

In a further aspect, the invention provides methods for treating exhaust gas from an internal combustion engine comprising carbon monoxide, hydrocarbons and/or nitrogen oxides, the method comprising contacting the gas in the exhaust stream of the engine with hollow porous microspheres supporting a catalyst, as described above, under conditions suitable for CO oxidation, HC oxidation and/or NOx reduction. The hollow porous microsphere catalyst may be formed as a layer on a support for use as a catalyst article as described above. In particular, CO and NOx in the exhaust stream are substantially reduced by contact with the catalysts and catalyst articles of the invention.

In a further aspect, a catalyst article comprising the hollow porous microspheres supporting a catalyst may be included in an emissions treatment system for treating the exhaust gas from an internal combustion engine. The treatment system comprises a catalyst article comprising the catalyst in flow communication with the engine exhaust stream. The emissions treatment system, in certain embodiments, further comprises one or more of a diesel oxidation catalyst (DOC), a diesel particulate filter (DPF), a catalytic partial oxidation catalyst (CPO), an ammonia oxidation catalyst (AMOX), a reductant injector, an air injector, a hydrocarbon injector, a selective catalytic reduction catalyst (SCR), a water gas-shift catalyst, and a steam-reforming catalyst. Certain embodiments of the methods of treating an exhaust stream comprise passing the exhaust stream through, or contacting the exhaust stream with, the catalyst article herein described.

EXAMPLES

Example 1

Preparation and Physical Properties of Hollow Microsphere Alumina

The preparation of hollow microsphere alumina involved (1) slurrying 1330 grams of a pseudo boehmite in 7500 grams of DI-water; to form slurry A, (2) dissolving 35 grams of a soft polymer in 250 grams of water to form solution B; (3) adding Solution B to Slurry A while stifling; thus forming Slurry C, (4) spray drying Slurry C using a spray drier at an inlet temperature of 310° C., outlet temperature between 110° C. and 120° C., atomizing wheel turning speed of 30,000 RPM (revolution per minute), and slurry feed rate 50 cc/minute, and (5) heating the spray dried powder at to 550° C. at a heating rate of 1° C./min in flow air and staying at 550° C. for 2 hours.

Figure 3B:
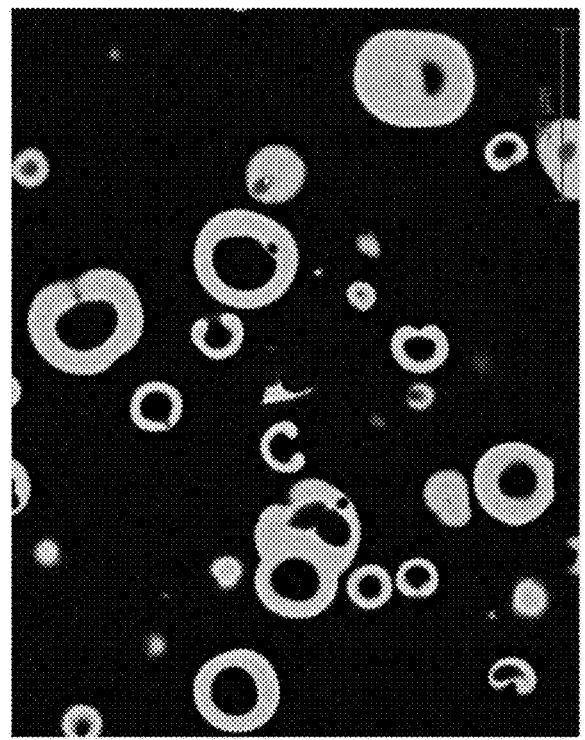
FIG. 3A and FIG. 3B illustrate the results of Example 1, showing the SEM morphology (FIG. 1A) and cross section (FIG. 1B) of a typical hollow microsphere alumina according to the invention.
Figure 3A:
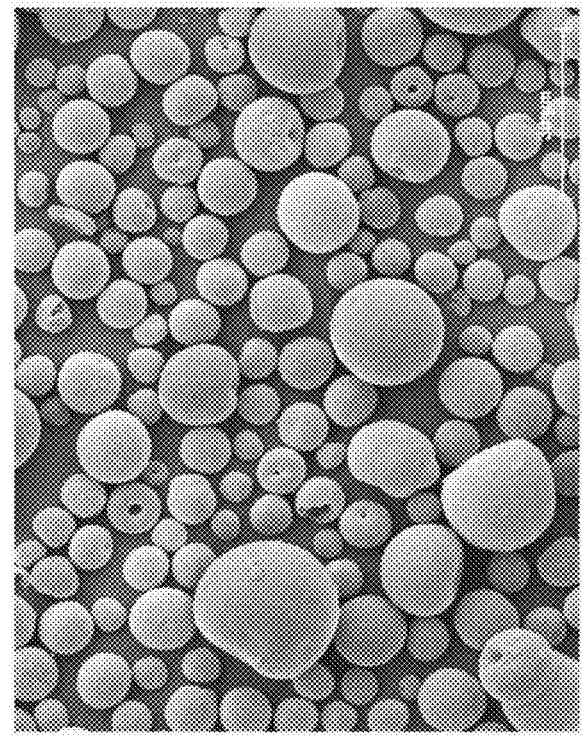
Figure 4:
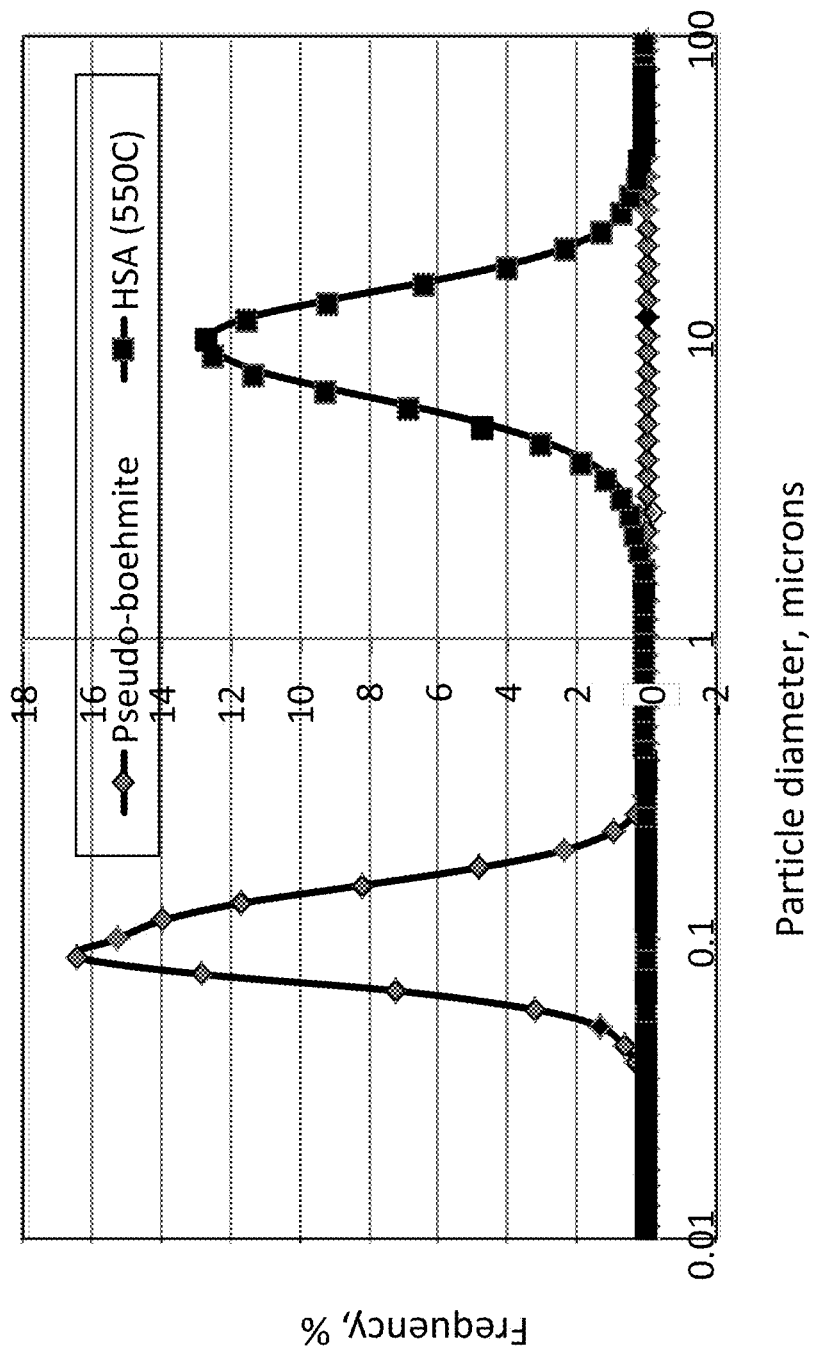
FIG. 4 illustrates the results of Example 1, showing the particle size distribution of pseudo boehmite precursor and hollow microsphere alumina.

SEM data was collected on a JEOL JEM2011 200 KeV LaB6 source microscope with a Bruker Ge EDS system using Spirit software. Digital images were captured with a bottom mount Gatan 2K CCD camera and Digital Micrograph collection software. All cross section samples were prepared and analyzed as dry dispersions on 200 mesh lacey carbon coated Cu grids. Cross-sectioned samples were mounted in a Buehler Epothin epoxy/hardener (contains S and Cl) and coated with a 30 nm carbon layer using a Denton DV-502A Vacuum Coater. FIG. 3 shows typical SEM (scanning electron microscopy) images of the morphology and cross section of hollow microsphere alumina made by this process. Although most particles are in the form of hollow spheres, there are some broken spheres and solid spheres. There are also small hollow spheres that are encapsulated in a bigger hollow structure. The distributions of the various shaped hollow spheres and solid spheres depend on the type and amount of alumina precursor and the polymer template used in the synthesis.

Average particle size was measured on a Horiba LA-950 particle size analyzer. For a typical measurement, 0.1 g of sorbent was slurried in water. The particle size (diameter) is expressed as values less than 50% and 90% of total particles, $D_{50}$ and $D_{90}$, respectively. The $D_{90}$ of the hollow microsphere alumina is about 10 µm as compared to about 100 nm (0.1 µm) for the starting pseudo boehmite, as shown in FIG. 3. After calcination at 550° C., the hollow sphere structure was fairly robust against milling or hydrothermal treatment. For example, the hollow structures remained relatively intact after a hydrothermal aging at 950° C./10% $H_2O$/air/4 hours or a physical ball-milling for about 30 minutes. The fine pseudo boehmite particles were changed to gamma alumina after the calcination and formed a strong bonded hollow microsphere structure.

Figure 5:
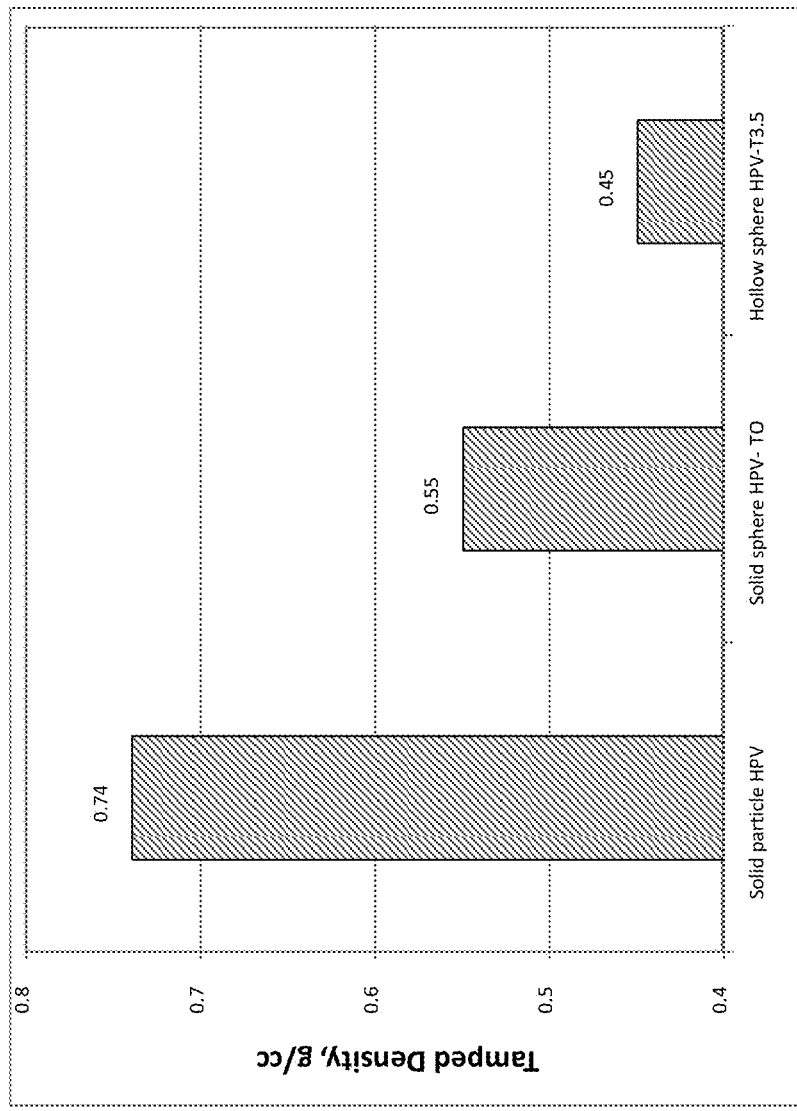
FIG. 5 illustrates the results of Example 1, showing the tamped density of solid particle, solid sphere, and hollow microsphere alumina.

Tamped density_measurement involved filling the sorbent sample into a 60 ml level in a 100 ml graduated plastic cylinder, tapping the cylinder on RoTAP R-30050 (WS Tayler, Inc) for 3000 times automatically, and then measuring the final volume and mass of the sample. The tamped density is defined as the mass divided by the final volume. The relative error of measurement is about ±5%. Because of the void inside of the hollow microsphere, its tamped density is lower than the solid particles or solid spheres, as shown in FIG. 5. In general, the hollow microsphere is lighter by about 30% than solid particles and 20% lighter than solid microspheres which were made in the same way as hollow microsphere except no polymer template was used.

$N_2$ porosity_data were obtained on a Micromeritics TriStar 3000 porosity analyzer. A 0.3-0.5 gram sample was first degassed at 300° C. for 6 hours and then was equilibrated in liquid nitrogen. The total surface area was calculated based on the BET method. The pore volume (PV) was calculated using the single-point total pore volume for pores between 10 and 1400 Å radius. The average pore diameter (PD) was calculated using the method of 4V/A by BET. Table 1 shows the $N_2$ porosity data of hollow microsphere $Al_2O_3$ and $ZrO_2/Al_2O_3$ as compared to solid alumina particles which were obtained by calcining the pseudo boehmite without spray drying. Fresh samples were calcined at 550° C. in air for 2 hours. The aged samples were steam-aged at 750° C. with 10% $H_2O$ in air for 20 hours.

TABLE 1

$N_2$ porosity of hollow microsphere alumina vs. solid alumina particles

| Sample | BET, m²/g | | Pore volume, cc/g | | Pore Size, Å | |
| --- | --- | --- | --- | --- | --- | --- |
| | Fresh | Aged | Fresh | Aged | Fresh | Aged |
| Solid Alumina Particles | 191 | 131 | 0.43 | 0.43 | 89 | 133 |
| Hollow Micro sphere Alumina | 197 | 137 | 0.43 | 0.44 | 88 | 130 |
| Hollow Micro sphere Alumina coated w/$ZrO_2$ | 181 | 129 | 0.34 | 0.35 | 76 | 108 |

Example 2

Preparation of a Hollow Microsphere Alumina Containing Lanthanum or Barium Stabilizer Hollow microsphere alumina prepared according to Example 1 was impregnated with lanthanum or barium aqueous solution by incipient wetness. The paste was dried, ground, and calcined at 550° C. in air for 2 hours. The dry gain of the lanthanum or barium in the final calcined powder was 4%. The La- or Ba-stabilized hollow microsphere alumina were identified as HMA-La4 and HMA-Ba4, respectively. For comparison, the hollow microsphere alumina was replaced by solid alumina particles (not spray dried) or solid sphere alumina (spray dried without using polymer template).

Example 3

Preparation of a Single Layer Core Catalyst Containing Palladium Supported on Hollow Microsphere Alumina A powder catalyst containing hollow sphere alumina was prepared by impregnating hollow microsphere alumina or La- or Ba-stabilized hollow microsphere alumina with palladium nitrate aqueous solution. The impregnated paste was dried at 110° C. overnight, ground, and calcined at 550° C. in air for 2 hours. The dry gain (DG) of palladium on the alumina was 2%.

A coating slurry was made by mixing the 2% Pd/alumina powder with an alumina binder and DI-water. The slurry was ball-milled, which yielded a particle size of $D_{90}$ about 10 μm. The slurry was coated on a ceramic monolith honeycomb core (1 inch diameter by 1 inch height). The coated core was dried and then calcined at 550° C. in air for 2 hours. The DG of powder on the core was 0.60 gram/core, which yielded a precious metal loading of 25 grams/ft$^3$. For comparison, the hollow microsphere alumina was replaced by a reference La-stabilized alumina particle or by a La-stabilized solid sphere alumina while other catalyst compositions remained the same.

Example 4

Preparation of a Fully Formulated Catalyst Part (1) Formation of the bottom catalytic layer. A palladium component in the form of a 20% aqueous solution and a platinum component in the form of 13% aqueous solution were mixed with the La-stabilized hollow microsphere alumina and water to form a wet powder achieved by incipient wetness. Separately, a palladium component in the form of 20% solution was mixed with OSC materials and water to form a wet powder achieved by incipient wetness. The two wet powders were mixed and milled to a particle size of $D_{90}$ about 20 μm. Ceria-zirconia, octanol, acetic acid, alumina binder, and zirconium acetate were added and combined with the Pd/support mixture in a planetary mixer (P-mixer). The slurry was coated onto a metallic support carrier using deposition methods known in the art for depositing the catalyst on a metal substrate. After coating, the carrier with the bottom catalytic layers was dried, then calcined at a temperature of 550° C. for about 2 hours. The final bottom coat catalyst composition contained the following components: La-stabilized hollow microsphere alumina 54.7% of dry gain (DG), OSC 41.0% of DG, barium oxide 2.7% of DG, palladium 1.6% of DG, and platinum 0.01% of DG.

(2) Formation of the top coat catalytic layer. The second catalytic layer consisting of rhodium and platinum supported on OSC materials was coated on the first catalytic layer (bottom coat) using substantially similar procedures for the bottom coat. The final top coat catalyst layer composition contained the following components: OSC 69.6% of dry gain (DG), Zr-stabilized alumina 27.8% of DG, $ZrO_2$ 2.3% of DG, rhodium 0.19% of DG, and platinum 0.08% of DG. For comparison, the hollow microsphere alumina was replaced by a reference La-stabilized alumina particle in the bottom coat while other catalyst compositions remained the same.

Example 5

Catalyst Activity Evaluation on Single-Layer Core Catalysts Using a Lab Reactor

Figure 6:
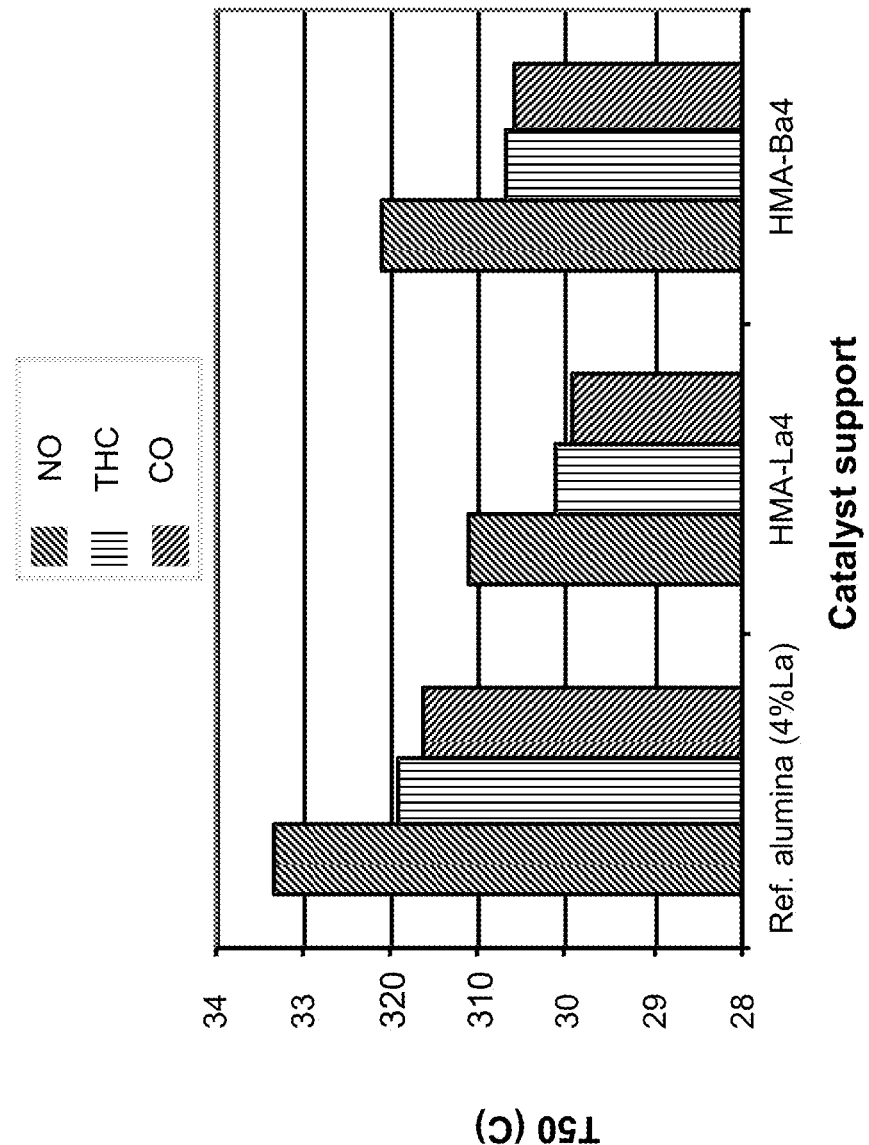
FIG. 6 illustrates the results of Example 5, showing the effect of catalyst support on the light-off temperature for single layer, Pd catalyst core samples.

The catalytic performance of the single layer Pd/alumina catalyst cores prepared in Example 3 were evaluated in a flow-through reactor at 40,000 hr$^{-1}$ space velocity with gas composition as follows: CO about. 0.5-5.6%; $CO_2$ 10%, HC 1350 ppm ($C_3H_6/C_3H_8$=2); NO 400 ppm; $H_2O$ about 6-7%. The lambda varied with $CO/O_2$ to match rich (lambda about 0.93) and lean (lambda about 1.04) conditions. Steam aging was conducted at 900° C., 10% $H_2O$ in air for 4 hours. Catalyst performance is expressed as light off temperature $T_{50}$ which is defined as the temperature at which the conversion of the pollutant reaches 50% of its starting value. The results are shown in FIG. 6. The catalysts containing La- or Ba-stabilized hollow microsphere alumina showed a significantly lower $T_{50}$ values (or higher catalyst activity) for CO, HC, and NO than the reference catalyst containing traditional solid La-stabilized alumina particles.

Example 6

Motorcycle Vehicle Evaluation of Fully Formulated Catalysts

Figure 7:
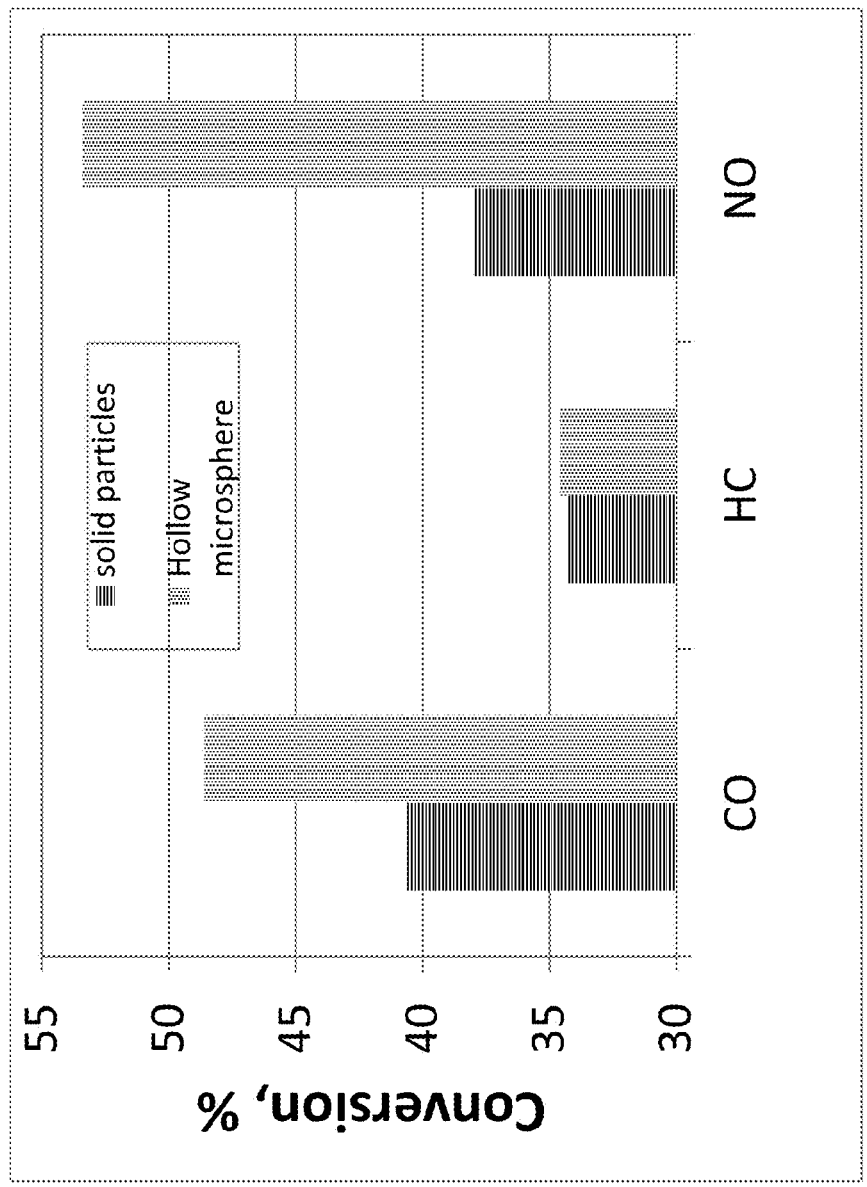
FIG. 7 illustrates the results of Example 6, comparing CO, hydrocarbon and nitric oxide conversion for a hollow alumina microsphere/platinum/palladium/rhodium catalyst and a solid alumina particle/platinum/palladium/rhodium catalyst in a motorcycle application.

The fully formulated catalyst parts containing hollow porous microspheres alumina according to Example 4 were tested under engine operating conditions in a motorcycle application. A conventional solid particulate alumina catalyst (40 g/ft$^3$ Pt/Pd/Rh=1/20/2) was compared with the hollow porous microspheres supporting the same catalyst. CO, HC and NO conversion was evaluated after aging at 900 degrees ° C. in air and nitrogen with steam for a total of 8 hrs. The results are shown in FIG. 7. CO conversion using the hollow microsphere catalyst was 20% better than the reference catalyst, HC conversion was 1% better and NO conversion was 41% better.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A composition comprising hollow metal oxide microspheres, the microspheres comprising walls having a thickness of about 1-5 microns surrounding a hollow center, wherein the $D_{90}$ diameter of the hollow metal oxide microspheres is about 5-20 microns.

2. The composition of claim 1, further comprising a catalyst.

3. The composition of claim 2, wherein the catalyst is incorporated within the walls of the hollow metal oxide microspheres.

4. The composition of claim 2, wherein the catalyst is in higher concentration on an exterior surface of the hollow metal oxide micro spheres.

5. The composition of claim 2, further comprising a stabilizer selected from the group consisting of a lanthanide, an alkaline earth metal, silicon, a transition metal, and combinations thereof.

6. The composition of claim 5, wherein the stabilizer is 4% by weight La.

7. The composition of claim 2, wherein the metal oxide microspheres comprise a stabilizer selected from barium oxides, lanthanum oxides, zirconium oxides, and combinations thereof, and a platinum group metal as the catalyst.

8. The composition of claim 2, wherein the metal oxide microspheres comprise alumina or boehmite stabilized with a stabilizer selected from barium oxides, lanthanum oxides, zirconium oxides, and combinations thereof, and further comprise a platinum group metal as the catalyst, the catalyst being on the outer surface of the microspheres or within the walls of the microspheres.

9. The composition of claim 1, wherein the metal oxide microspheres comprise a metal oxide selected from the group consisting of alumina, boehmite, pseudoboehmite, ceria, zirconia, ceria-zirconia, alumina-zirconia, alumina-ceria-zirconia, lanthana-alumina, lanthana-zirconia-alumina, baria-alumina, baria-lanthana-alumina, baria-lanthana-neodymia alumina, and alumina-ceria.

10. The composition of claim 1, wherein the metal oxide microspheres comprise alumina or boehmite and a stabilizer selected from barium oxides, lanthanum oxides, zirconium oxides, and combinations thereof.

11. The composition of claim 1, further comprising a stabilizer forming an outer layer of the metal oxide microspheres.

12. The composition of claim 11, wherein the stabilizer is selected from barium oxides, lanthanum oxides, zirconium oxides, and combinations thereof.

13. A catalyst article for use in an internal combustion engine comprising a catalytic layer formed on a substrate, the catalytic layer comprising the composition of claim 2.

14. The catalyst article of claim 13, wherein the hollow metal oxide microspheres further comprise a stabilizer selected from the group consisting of a lanthanide, an alkaline earth metal, silicon, a transition metal, and combinations thereof.

15. The catalyst article of claim 14, wherein the catalyst is a platinum group metal catalyst.

16. The catalyst article of claim 14, wherein the stabilizer is 4% by weight La.

17. The catalyst article of claim 13, wherein the substrate is a monolithic substrate.

18. The catalyst article of claim 13, wherein the substrate is a metal substrate.

19. A method of treating engine exhaust comprising hydrocarbons, carbon monoxide and/or nitrogen oxides comprising contacting the exhaust with the catalyst article of claim 13 under conditions suitable for oxidation of carbon monoxide, oxidation of hydrocarbons and/or reduction of nitrogen oxides.

20. A method of making a catalyst article comprising depositing a slurry on a substrate to form a catalytic layer on the substrate, the slurry comprising the hollow metal oxide microspheres of claim 2.

21. An emissions treatment system comprising a catalyst article in emissions flow communication with an engine exhaust stream, wherein the catalyst article comprises a catalytic layer formed on a substrate, the catalytic layer comprising:
   a) hollow metal oxide microspheres, the microspheres comprising walls having a thickness of about 1-5 microns surrounding a hollow center, wherein the $D_{90}$ diameter of the hollow metal oxide microspheres is about 5-20 microns, and
   b) a catalyst supported by the hollow metal oxide microspheres.

22. The emission treatment system of claim 21, further comprising at least one of a diesel oxidation catalyst, a diesel particulate filter, a catalytic partial oxidation catalyst, an ammonia oxidation catalyst, a water-gas shift catalyst, a steam reforming catalyst, a reductant injector, an air injector, a hydrocarbon injector and a selective catalytic reduction catalyst.

* * * * *